United States Patent
Mitsui

(10) Patent No.: US 6,261,112 B1
(45) Date of Patent: Jul. 17, 2001

(54) DEVICE FOR ELECTRICAL CONNECTION BETWEEN ROTOR AND STATOR

(75) Inventor: Takahiko Mitsui, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/488,564

(22) Filed: Jan. 21, 2000

(30) Foreign Application Priority Data

Jan. 28, 1999 (JP) .................................................. 11-020332

(51) Int. Cl.$^7$ ...................................................... H01R 3/00

(52) U.S. Cl. ............................................. 439/164; 439/15

(58) Field of Search ...................................... 439/164, 15

(56) References Cited

U.S. PATENT DOCUMENTS

| | | | |
|---|---|---|---|
| 5,551,886 | * 9/1996 | Zeller et al. | 439/164 |
| 5,588,854 | * 12/1996 | Ikumi et al. | 439/164 |
| 5,980,285 | * 11/1999 | Matsumoto | 439/164 |

FOREIGN PATENT DOCUMENTS 8-78125   3/1996   (JP) .

* cited by examiner

*Primary Examiner*—Renee Luebke
*Assistant Examiner*—Briggitte Hammond
(74) *Attorney, Agent, or Firm*—Finnegan, Henderson, Farabow, Garrett & Dunner, L.L.P.

(57) ABSTRACT

An electrical connecting device is provided between a steering wheel of a vehicle and a steering column. The device includes a housing 1 and a rotor 2 rotatably arranged in the housing 1, defining an annular cable accommodating chamber 4 between the rotor 2 and the housing 1. A flexible flat cable 5 is accommodated in the cable accommodating chamber 4. The end portion of the cable 5 is wound along an inner peripheral face 4a of the chamber 4, while the other end portion of the cable 5 is wound along an outer peripheral face 4b. On an upper face 4c in the chamber 4, an inside projection 15 is formed so as to project downward on the inner peripheral side of the chamber 4, while an outside projection 16 is formed on the outer peripheral side of the chamber 4. The amount of projection of the inside projection 15 is smaller than the amount of projection of the outside projection 16.

4 Claims, 4 Drawing Sheets

DEVICE FOR ELECTRICAL CONNECTION BETWEEN ROTOR AND STATOR

BACKGROUND OF THE INVENTION

1. Field of the Invention

The present invention relates to a device for electrical connection between a rotor and a stator. More particularly, it relates to an electrical connecting device between a steering wheel (handle) and a steering column in a steering apparatus for a vehicle.

2. Description of the Related Art

With the recent progress of automotive electronics, the automotive steering wheel has been provided with a variety of switches for electronic controls, which are required to be connected to various elements on the steering column's side through electrical wiring. Since the automotive steering wheel is adapted so as to rotate in both clockwise and counter-clockwise directions at plural revolutions, there is generally used an electrical connecting device between the steering wheel and the steering column, in which a flexible flat cable (FFC) having a plurality of lead wires (or conductors) is whirled between a rotor fixed to a handle shaft and a housing fixed on the steering column's side, in spiral or "halfway-reversed" spiral condition.

As the conventional electrical connecting device of halfway-reversed type, there is known an electrical connecting device disclosed in Japanese Patent Publication No. 8-78125. FIGS. 1 to 4 show the structure of the electrical connecting device. In the device, a housing 1 consists of an under cover 1a and an upper cover 1b between which a rotor 2 is rotatably arranged. The rotor 2 comprises a lower rotor body 2a, an intermediate rotor body 2b and an upper rotor body 2c which are all integrated into one body through some screws 3. The resultant rotor 2 is fixed to a not-shown shaft on a steering wheel's side, while the housing 1 is fixed to a not-shown member on a steering column's side.

A ring-shaped cable accommodating chamber (annular space) 4 is defined between the housing 1 and the rotor 2. The cable accommodating chamber 4 has an inner peripheral face 4a and an inside lower face both constituted by the rotor 2. While, an outer peripheral face 4b, an upper face 4c and an outside lower face of the chamber 4 are constituted by the housing 1. A flexible flat cable (FFC) 5 is accommodated in the cable accommodating chamber 4. The flexible flat cable 5 has one end connected to a connector 6 on the rotor's side and the other end connected to a connector 7 on the housing's side. The end portion of the flexible flat cable 5 is wound around the inner peripheral face 4a in one winding direction. While, the other end portion of the cable 5 is wound along the outer peripheral face 4b in another direction opposite to the above winding direction. Thus, the cable's winding direction on the inner peripheral face's (4a) side is reversed to the cable's winding direction on the outer peripheral face's (4b) side, forming a turn-over part 5a as a boundary.

In the cable accommodating chamber 4, there are provided a carrier 9 for rotatably supporting a number of guide rollers 8 through pins 9a, and a movable internal gear 10. The carrier 9 is arranged between a winding part 5b of the cable 5 on the side of an inner peripheral face 4a and another winding part 5c on the side of an outer peripheral face 4b. The above turn-over part 5a of the cable 5 is disposed about the designated guide roller 8 on the carrier 9. Below the carrier 9, a planetary gear 11 is rotatably supported by the carrier 9. The planetary gear 11 meshes with both outer teeth 12 formed on the intermediate rotor body 2b and inner teeth 13 formed on the internal gear 10.

As shown in FIG. 4, the upper cover 1b is provided, on the upper face 4c of the chamber 4, with an inside projection 14a and an outside projection 14b which both project downward on the inner peripheral side and the outer peripheral side of the chamber 4, respectively. In the circumferential direction of the upper cover 1b, the inside projection 14a is formed on a level with the outside projection 14b.

In the above-mentioned arrangement, when the rotor 2 rotates in the clockwise direction (i.e. the direction of $\underline{a}$ of FIG. 2), then the winding part 5b about the inner peripheral face 4a is continuously fed out to be the turn-over part 5a about the designated guide roller 8 on the carrier 9 and finally rolled into the outer peripheral face 4b.

With this feeding and rolling operation of the flexible flat cable 5, the turn-over part 5a of the cable 5 gradually moves in the clockwise direction. During this movement, the planetary gear 11 is rotated by the rotation of the rotor 2. Further, due to the transmission of rotating force, the carrier 9 is also moved to the clockwise direction in the chamber 4. In this way, the electrical connecting device can perform the cable feeding and rolling operations while the flexible flat cable 5 is subjected to no external force from the carrier 9.

On the contrary, when the rotor 2 rotates in the counter-clockwise direction (i.e. the direction of $\underline{b}$ of FIG. 2), then the winding part 5c about the outer peripheral face 4b is continuously fed out to be the turn-over part 5a about the designated guide roller 8 on the carrier 9 and finally rolled into the inner peripheral face 4a. The carrier 9 is moved to the counter-clockwise direction in the chamber 4 for the above-mentioned reason. In this way, also in this case, the electrical connecting device can perform the cable feeding and rolling operations while the flexible flat cable 5 is subjected to no external force from the carrier 9.

Meanwhile, if the turn-over part 5a of the flexible flat cable 5 slides on the upper face 4c of the chamber 4 in process of clockwise or counter-clockwise movement of the part 5a, then a great noise may be produced since the turn-over part 5a is arranged relatively free in vibration. It should be understood that, in the conventional device, the provision of the projections 14a and 14b on the upper face 4c is based on such an apprehension of noise.

That is, even if the upward force is applied on the flexible flat cable 5, the turn-over part 5a of the flexible flat cable 5 is prevented from the contact with the upper face 4c, owing to the initiative contact of the winding parts 5b and 5c with the projections 14a and 14b.

However, it is also noted that, in the conventional electrical connecting device between the steering wheel and the steering column, the winding part 5b of the cable 5 (on the side of the inner peripheral face 4a) rotates together with the rotation of the rotor 2. Consequently, the sliding of the top edge of the cable part 5b on the inside projection 14a would cause the occurrence of noise.

SUMMARY OF THE INVENTION

It is therefore an object of the present invention to provide an electrical connecting device which is capable of preventing the occurrence of noise due to the slide of the turn-over part of the flexible flat cable on the housing and noise due to the inside winding part of the cable on the housing thereby to further reduce the sliding noise while saving the manufacturing cost.

The object of the present invention described above can be accomplished by an electrical connecting device between a steering wheel and a steering column for a vehicle, comprising:

a housing fixed on the interior of the steering column;

a rotor rotatably arranged in the housing so as to define an annular cable accommodating chamber between the rotor and the housing, the rotor constituting the inner peripheral face of the cable accommodating chamber while at least the housing constitutes the outer peripheral face and the upper face of the cable accommodating chamber;

a flexible flat cable accommodated in the cable accommodating chamber, the flexible flat cable having its one end fixed on the rotor and the other end fixed on the housing, the end portion of the flexible flat cable being wound along the inner peripheral face in one winding direction while the other end portion of the flexible flat cable being wound along the outer peripheral face in the opposite winding direction in a manner that the winding direction of the flexible flat cable is reversed to the opposite winding direction of the flexible flat cable on the boundary of a turn-over part of the flexible flat cable;

an inside projection formed on the upper face defining the cable accommodating chamber so as to project downward on the inner peripheral side of the cable accommodating chamber; and an outside projection formed on the upper face defining the cable accommodating chamber so as to project downward on the outer peripheral side of the cable accommodating chamber;

wherein the amount of projection of the inside projection is smaller than the amount of projection of the outside projection.

With the feeding and rolling operation of the flexible flat cable, the turn-over part of the cable also moves to the clockwise or counter-clockwise direction gradually. During this movement, if an external force is applied on the cable to displace it upward, the flexible flat cable firstly comes into contact with the outside projection through the intermediary of the top edge of the winding part of the cable on the side of the outer peripheral face, so that the upward movement of the cable is restricted.

Therefore, the turn-over part of the cable does not contact with the upper face of the cable accommodating chamber and furthermore, the top edge of the winding part of the cable on the side of the inner peripheral face does not contact with the inside projection since it is smaller than the outside projection in terms of its projecting amount.

In the present invention, preferably, the inside projection is provided with an inside sliding face, while the outside projection is provided with an outside sliding face. In this arrangement, a clearance between the flexible flat cable and the inside sliding face is larger than a clearance between the flexible flat cable and the outside sliding face.

Even if the cable is subjected to upward force during the feeding and winding operation of the cable, the upward movement of the cable is restricted by the outside sliding face. Therefore, the inside winding part of the cable almost never contacts with the upper face of the cable accommodating chamber. Consequently, it is possible to reduce the sliding noise between the housing and the flexible flat cable remarkably.

According to the present invention, there is also provided an electrical connecting device comprising:

a stator in form of a substantially cylindrical housing;

a rotor rotatably arranged in the stator so as to define an annular cable accommodating chamber between the rotor and the stator, the rotor constituting the inner peripheral face of the cable accommodating chamber while at least the stator constitutes the outer peripheral face and the upper face of the cable accommodating chamber;

a flexible flat cable accommodated in the cable accommodating chamber, the flexible flat cable having its one end fixed on the rotor and the other end fixed on the stator, the end portion of the flexible flat cable being wound along the inner peripheral face in one winding direction while the other end portion of the flexible flat cable being wound along the outer peripheral face in the opposite winding direction in a manner that the winding direction of the flexible flat cable is reversed to the opposite winding direction of the flexible flat cable on the boundary of a turn-over part of the flexible flat cable;

an inside projection formed on the upper face defining the cable accommodating chamber so as to project downward on the inner peripheral side of the cable accommodating chamber; and an outside projection formed on the upper face defining the cable accommodating chamber so as to project downward on the outer peripheral side of the cable accommodating chamber;

wherein the amount of projection of the inside projection is smaller than the amount of projection of the outside projection.

The operation and effects of the above-mentioned electrical connecting device are similar to those of the previous electrical connecting device between the steering wheel and the steering column.

Also in this case, preferably, the inside projection is provided with an inside sliding face, while the outside projection is provided with an outside sliding face and furthermore, a clearance between the flexible flat cable and the inside sliding face is larger than a clearance between the flexible flat cable and the outside sliding face.

These and other objects and features of the present invention will become more fully apparent from the following description and appended claims taken in conjunction with the accompany drawing.

DESCRIPTION OF THE PREFERRED EMBODIMENT

Figure 5:
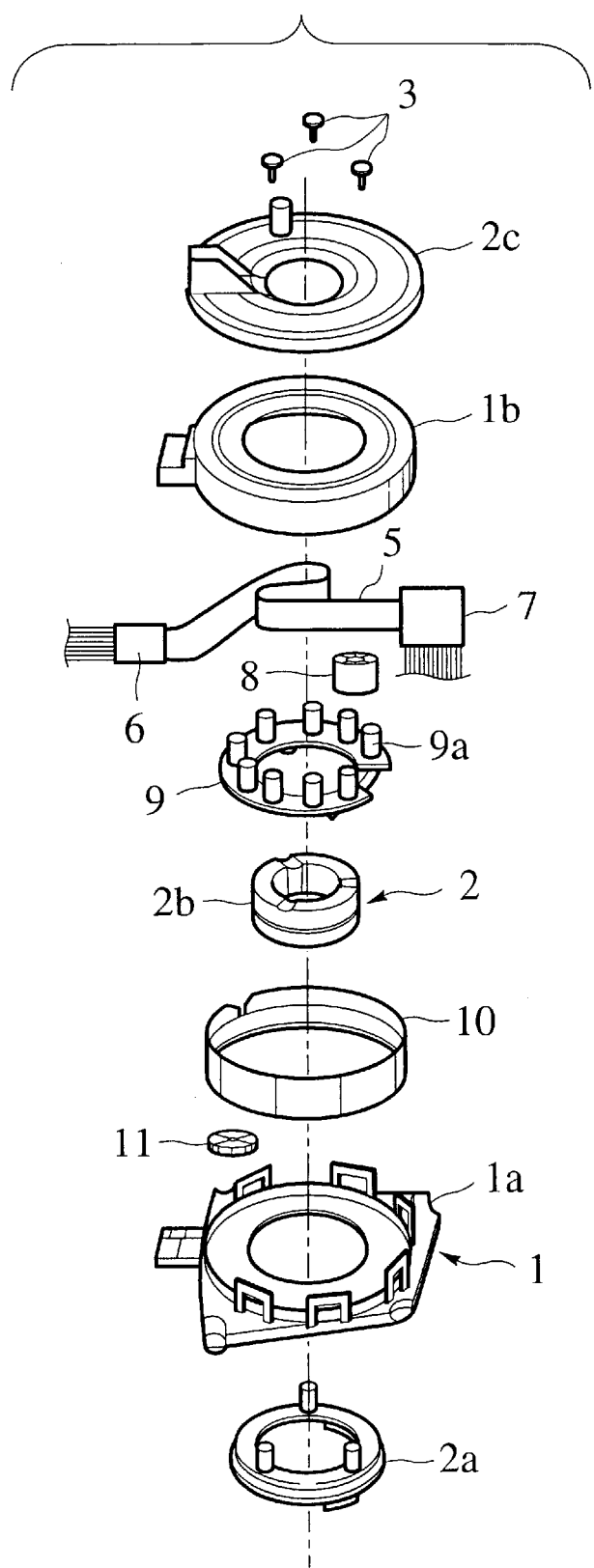
FIG. 5 is an exploded perspective view of an electrical connecting device between a steering wheel and a steering column in accordance of an embodiment of the present invention.

One embodiment of the present invention will be described with reference to the drawings. In figures, FIG. 5 is a perspective view of an exploded electrical connecting device of the embodiment of the invention, FIG. 6 a schematic perspective view of the electrical connecting device of FIG. 5, and FIG. 7 is a partial sectional view taken along a line B—B of FIG. 6. Note, in these figures, reference numerals similar to those of FIGS. 1 to 4 are indicated with the same reference numerals, respectively.

As shown in FIG. 5, the housing 1 consists of the under cover 1a and the upper cover 1b between which the rotor 2 is rotatably arranged. The rotor 2 comprises the lower rotor body 2a, the intermediate rotor body 2b and the upper rotor body 2c which are all integrated into one body through some screws 3. The resultant rotor 2 is fixed to a not-shown shaft on the steering wheel's side, while the housing 1 is fixed to a not-shown member on the steering column's side.

Figure 6:
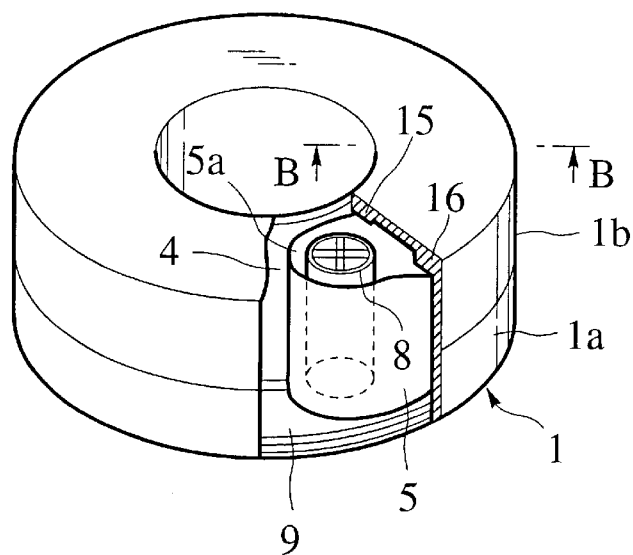
FIG. 6 is a schematic perspective view of the electrical connecting device of FIG. 5, showing an interior of the housing.
Figure 7:
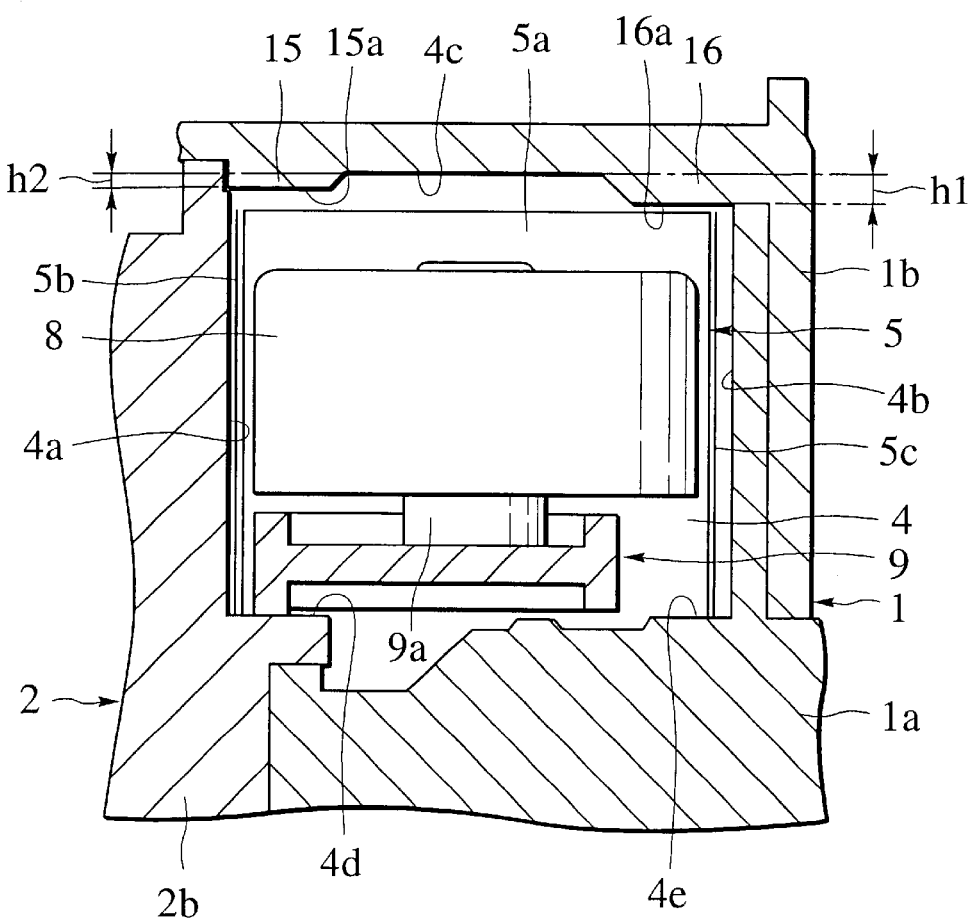
FIG. 7 is a partial sectional view taken along a line B—B of FIG. 6.

FIG. 6 is a perspective view of the assembled electrical connecting device, also showing the interior of the housing 1. FIG. 7 is a partial sectional view of the electrical connecting device, taken along a line of B—B of FIG. 6.

Defined between the housing 1 and the rotor 2 is the ring-shaped cable accommodating chamber (annular space) 4 which has the inner peripheral face 4a and an inside lower face 4d both constituted by the rotor 2. In the cable accommodating chamber 4, all of the outer peripheral face 4b, the upper face 4c and an outside lower face 4e are constituted by the housing 1. The flexible flat cable (FFC) 5 is accommodated in the so-constructed cable accommodating chamber 4.

The flexible flat cable 5 is constituted in the form of a band where a plurality of conductors of copper etc. extend on one side of a base film of an insulating tape, such as PET. The flexible flat cable 5 has one end connected to a connector 6 on the rotor's side and the other end connected to a connector 7 on the housing's side. The inside end portion of the flexible flat cable 5 is wound around the inner peripheral face 4a in one rotating direction (see FIG. 2 as reference). On the other hand, the outside end portion of the cable 5 is wound along the outer peripheral face 4b in the opposite direction. Thus, the cable winding direction on the inner peripheral face's (4a) side is opposite to the cable winding direction on the outer peripheral face's (4b) side, at the center of the turn-over part 5a as the boundary.

In the cable accommodating chamber 4, the ring-shaped carrier 9 is also arranged so as to slide between the inner winding part 5b of the cable 5 (on the side of the inner peripheral face 4a) and the outer winding part 5c (on the outer peripheral face 4b). The carrier 9 is provided, at predetermined intervals, with a plurality of pins 9a each of which supports each guide roller 8 rotatably. The above turn-over part 5a of the cable 5 is positioned between the adjacent guide rollers 8, 8 in pairs.

According to the embodiment, on the upper face 4c of the cable accommodating chamber 4, an inside annular projection 15 and an outside annular projection 16 are formed integrally with the housing 1 so as to project downward on inner and outer sides of the cable accommodating chamber 4, respectively. Further, according to the embodiment, an amount h1 of projection of the outside projection 16 is established larger than an amount H2 of projection of the inside projection 15. (h1>h2) In other words, it is established that a clearance between an inside sliding face 15a on the inside projection 15 and the top edge of the flat cable 5 becomes larger than a clearance between an outside sliding face 16a on the outside projection 16 and the top edge of the flat cable 5. Thus, the outside sliding face 16a of the outside projection 16 is closer to the top edge of the flat cable 5, in comparison with the inside sliding face 15a of the inside projection 15.

Figure 1:
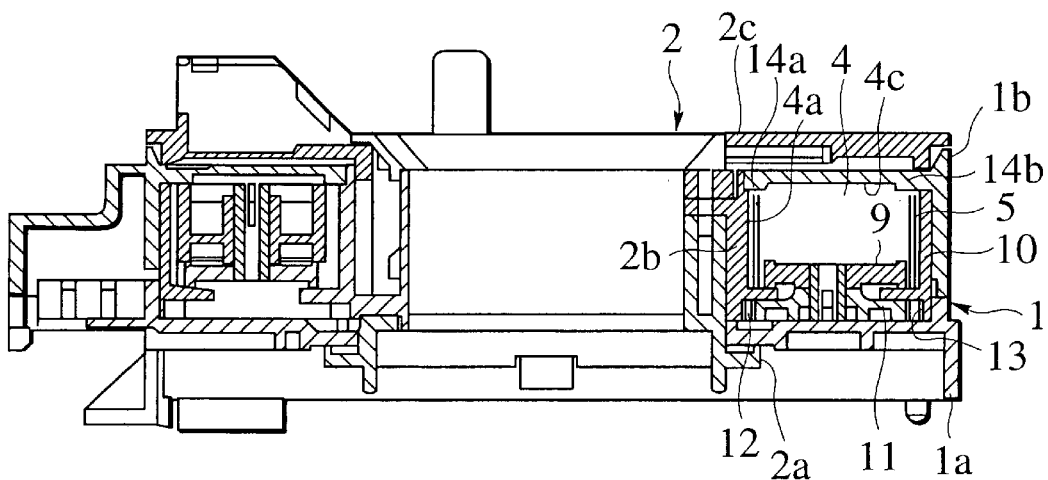
FIG. 1 is a sectional view of an earlier art electrical connecting device.
Figure 2:
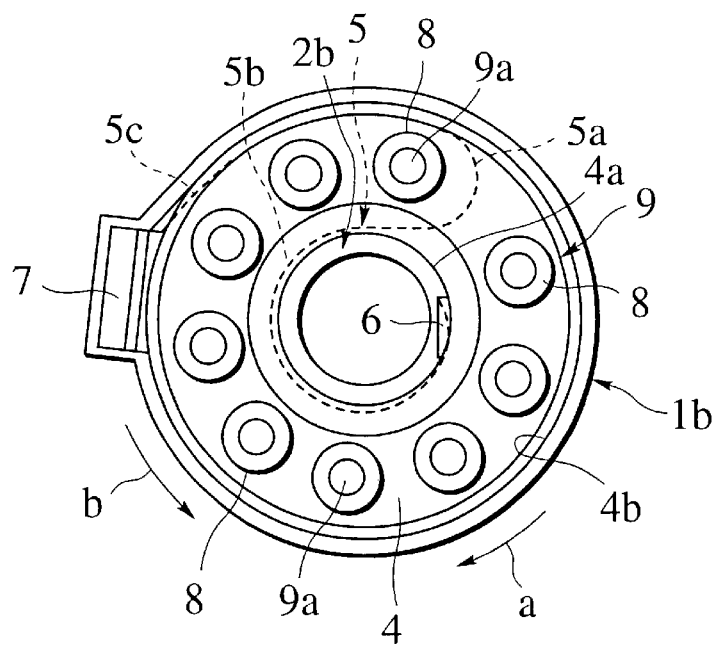
FIG. 2 is a schematic plan view of the electrical connecting device of FIG. 1, eliminating a part of rotor and a part of housing.
Figure 3:
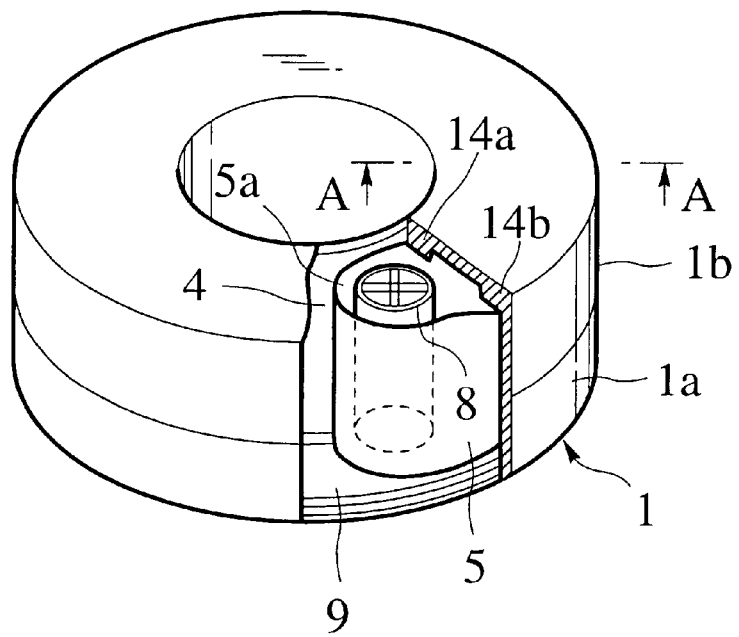
FIG. 3 is a schematic perspective view of the electrical connecting device of FIG. 2, showing an interior of the housing.
Figure 4:
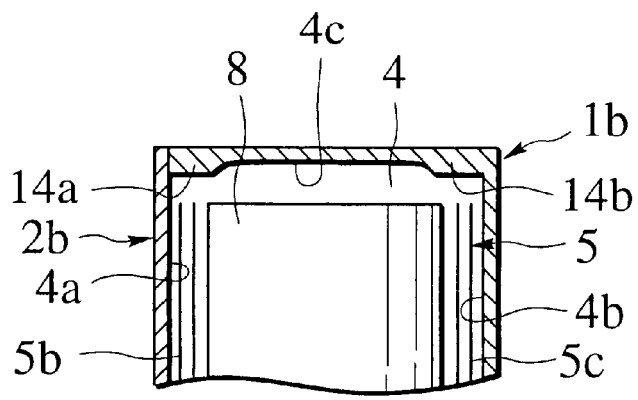
FIG. 4 is a partial sectional view taken along a line A—A of FIG. 3.

When the rotor 2 rotates in one rotating direction, for example, the clockwise direction in FIG. 2, then the winding part 5b on the side of the inner peripheral face 4a is fed out. Consequently, the so-fed cable portion is then reversed about one guide roller 8 on the carrier 9 and finally rolled to the side of the outer peripheral face 4b in the cable accommodating-chamber 4.

On the other hand, when the rotor 2 rotates in the counter-clockwise direction (FIG. 2), the winding part 5c on the side of the outer peripheral face 4b is fed out. Consequently, the so-fed cable portion is also reversed about the guide roller 8 on the carrier 9 and finally rolled to the side of the inner peripheral face 4a in the cable accommodating chamber 4.

Note, with the feeding and winding operation of the flexible flat cable 5, the turn-over part 5a of the cable 5 also moves to the clockwise or counter-clockwise direction gradually. During this movement, if an external force is applied on the cable 5 to displace it upward, the flexible flat cable 5 firstly comes into contact with the sliding face 16a of the outside projection 16 through the intermediary of the top edge of the winding part 5c on the side of the outer peripheral face 4b, so that the upward movement of the cable 5 is restricted.

Therefore, the turn-over part 5a of the cable 5 does not contact with the upper face 4c of the cable accommodating chamber 4 and furthermore, the top edge of the winding part 5b on the side of the inner peripheral face 4a does not contact with the inside sliding face 15a of the inside projection 15 since the inside projection 15 is smaller than the outside projection 16 in terms of its projecting amount. Thus, it is possible to prevent the occurrence of noise which would be caused by the sliding of the turn-over part 5a and the winding part 5b on the inner peripheral face's (4a) side on the housing 1, certainly. Consequently, the reduction of sliding noise can be further progressed in comparison with the conventional structure.

Alternatively, when the cable's winding part 5b on the inner peripheral face's (4a) side moves upward in spite of the restriction of the outside projection 16 against the upward movement of the flexible flat cable 5, the top edge of the cable 5 comes into contact with the inside sliding face 15a of the inside projection 15, so that the further upward movement of the cable 5 is restricted. Accordingly, since there is no possibility of sliding of the turn-over part 5a of the cable 5 at the intermediate position of the chamber 4 on the upper face 4c, it is possible to prevent the occurrence of noise derived from the sliding of the part 5a on the housing 1, which sliding may constitute a primary cause of large noise because the part's (5a) relative easiness of vibration.

That is, according to the present embodiment, it is possible to substantially prevent the occurrence of noise due to the sliding of the turn-over part 5a of the cable 5 on the housing 1 perfectly and also the occurrence of noise due to the sliding of the winding part 5b on the inner peripheral face's (4a) side on the housing 1.

In this way, since the clearance between the inside sliding face 15a of the inside projection 15 and the top edge of the cable 5 is established larger than the clearance between outside sliding face 16a of the outside projection 16 and the cable's top edge, the upward movement of the cable 5 can be restricted by the outside sliding face 16a even though the cable 5 is subjected to upward force during the feeding and winding operation of the cable 5, whereby the winding part 5b of the cable 5 is difficult to slide on the upper face 4c (or the inside sliding face 15a). As the result, it is possible to reduce the sliding noise between the upper cover 1b of the housing 1 and the flexible flat cable 5 remarkably.

Additionally, since the present device is provided by only making the projecting amount of the inside projection 15 smaller than that of the outside projection 16, the conventional electrical connecting device can be modified to the present device with minor changes in design, thereby measuring the prevention of occurrence of noise due to the sliding between the winding part 5b and the housing 1 with low cost.

Finally, it will be understood by those skilled in the art that the foregoing description is one of preferred embodiments of the disclosed electrical connecting device, and that various changes and modifications may be made to the present invention without departing from the spirit and scope thereof.

For example, although the electrical connecting device is applied for the electrical connection between the steering wheel and the steering column in the embodiment, of course, the present invention is applicable to other electrical connections between rotators and stators.

What is claimed is:

1. An electrical connecting device between a steering wheel and a steering column for a vehicle, the steering column having an interior and an exterior, the device comprising:

a housing fixed on the interior of the steering column;

a rotor rotatably arranged in the housing so as to define an annular cable accommodating chamber having an inner peripheral face and an outer peripheral face, wherein the accommodating chamber is located between the rotor and the housing, the rotor constituting the inner peripheral face of the cable accommodating chamber while at least the housing constitutes the outer peripheral face and the upper face of the cable accommodating chamber;

a flexible flat cable accommodated in the cable accommodating chamber, the flexible flat cable having one end fixed on the rotor and the other end fixed on the housing, the one end of the flexible cable being wound along the inner peripheral face in one winding direction and the other end of the flexible flat cable being wound along the outer peripheral face in an opposite winding direction in a manner that the winding direction of the flexible flat cable is reversed to the opposite winding direction of the flexible flat cable on a boundary of a turn-over part of the flexible flat cable;

an inside projection formed on an upper face defining the cable accommodating chamber so as to project downward in a projection direction on an inner peripheral side of the cable accommodating chamber; and an outside projection formed on an upper face defining the cable accommodating chamber so as to project downward in a projection direction on an outer peripheral side of the cable accommodating chamber;

wherein an amount of projection in the protection direction of the inside projection is smaller than an amount of projection in the projection direction of the outside projection.

2. An electrical connecting device as claimed in claim 1, wherein the inside projection is provided with an inside sliding face, while the outside projection is provided with an outside sliding face and wherein a clearance between the flexible flat cable and the inside sliding face is larger than a clearance between the flexible flat cable and the outside sliding face.

3. An electrical connecting device comprising:

a stator in form of a substantially cylindrical housing;

a rotor rotatably arranged in the stator so as to define an annular cable accommodating chamber having an inner peripheral face and an outer peripheral face, wherein the accommodating chamber is located between the rotor and the stator, the rotor constituting the inner peripheral face of the cable accommodating chamber while at least the stator constitutes the outer peripheral face and the upper face of the cable accommodating chamber;

a flexible flat cable accommodated in the cable accommodating chamber, the flexible flat cable having one end fixed on the rotor and the other end fixed on the stator, the one end of the flexible cable being wound along the inner peripheral face in one winding direction and the other end of the flexible flat cable being wound along the outer peripheral face in an opposite winding direction in a manner that the winding direction of the flexible flat cable is reversed to the opposite winding direction of the flexible flat cable on a boundary of a turn-over part of the flexible flat cable;

an inside projection formed on an upper face defining the cable accommodating chamber so as to project downward in a projection direction on an inner peripheral side of the cable accommodating chamber; and an outside projection formed on an upper face defining the cable accommodating chamber so as to project downward in a projection direction on an outer peripheral side of the cable accommodating chamber;

wherein an amount of projection in the projection direction of the inside projection is smaller than an amount of projection in the projection direction of the outside projection.

4. An electrical connecting device as claimed in claim 3, wherein the inside projection is provided with an inside sliding face, while the outside projection is provided with an outside sliding face and wherein a clearance between the flexible flat cable and the inside sliding face is larger than a clearance between the flexible flat cable and the outside sliding face.

* * * * *

UNITED STATES PATENT AND TRADEMARK OFFICE
CERTIFICATE OF CORRECTION

PATENT NO.     : 6,261,112 B1
DATED          : July 17, 2001
INVENTOR(S)    : Takahiko Mitsui et al.

It is certified that error appears in the above-identified patent and that said Letters Patent is hereby corrected as shown below:

<u>Column 8, claim 1,</u>
Line 1, "protection" should read -- projection --.

Signed and Sealed this

Second Day of April, 2002

Attest:

JAMES E. ROGAN
*Attesting Officer*     *Director of the United States Patent and Trademark Office*